United States Patent
Bockman et al.

(10) Patent No.: US 9,463,410 B2
(45) Date of Patent: Oct. 11, 2016

(54) TRACE COMPONENT REMOVAL IN CO2 REMOVAL PROCESSES BY MEANS OF A SEMIPERMEABLE MEMBRANE

(75) Inventors: Jon K Bockman, Oslo (NO); Michael Koch, Oslo (NO)

(73) Assignee: General Electric Technology GmbH, Baden (CH)

( * ) Notice: Subject to any disclaimer, the term of this patent is extended or adjusted under 35 U.S.C. 154(b) by 142 days.

(21) Appl. No.: 13/825,961

(22) PCT Filed: Sep. 14, 2011

(86) PCT No.: PCT/IB2011/002136
§ 371 (c)(1),
(2), (4) Date: Jun. 25, 2013

(87) PCT Pub. No.: WO2012/038794
PCT Pub. Date: Mar. 29, 2012

(65) Prior Publication Data
US 2013/0333568 A1    Dec. 19, 2013

(30) Foreign Application Priority Data
Sep. 23, 2010 (EP) .................................... 10178847

(51) Int. Cl.
*B01D 53/14* (2006.01)
*B01D 53/22* (2006.01)
(Continued)

(52) U.S. Cl.
CPC ....... *B01D 53/1425* (2013.01); *B01D 53/1475* (2013.01); *B01D 53/229* (2013.01);
(Continued)

(58) Field of Classification Search
CPC .......... B01D 53/1425; B01D 53/1475; B01D 53/229; B01D 53/62; B01D 61/025; B01D 2252/102; B01D 2257/504; B01D 2258/0283; F23J 15/04; F23J 2215/50; F23J 2219/40; Y02C 10/04; Y02C 10/06
USPC ...... 95/46, 188, 206, 232, 235, 236; 96/4, 6, 96/234, 240
See application file for complete search history.

(56) References Cited

U.S. PATENT DOCUMENTS 3,690,040 A * 9/1972 Halfon ........................... 95/236
4,725,424 A * 2/1988 Tanaka ..................... C09C 1/50
423/450
(Continued)

FOREIGN PATENT DOCUMENTS

CA  2106983 A1  9/1992
DE  41 09 267 C1 * 10/1992  ............. B01D 53/14
(Continued)

OTHER PUBLICATIONS

International Search Report and Written Opinion, From the International Searching Authority, PCT Patent Application No. PCT/IB2011/002136, Completed Jan. 17, 2012, Authorized Officer Thomas Bergt.
(Continued)

*Primary Examiner* — Jason M Greene
(74) *Attorney, Agent, or Firm* — Cynthia W. Flanigan (57) ABSTRACT

A system (1) for removing carbon dioxide (CO2) from a gas stream by bringing the gas stream into contact with a circulating ammoniated solution stream such that CO2 is absorbed in said ammoniated solution, characterized in that the system comprises a membrane purifier (17), said membrane purifier having a first compartment (18) and a second compartment (19), wherein said first and second compartment are separated by a semipermeable membrane (20), a method for removing carbon dioxide (CO2) from a gas stream by bringing the gas stream into contact with a circulating ammoniated solution stream such that CO2 is absorbed in said ammoniated solution, said method comprising the step of separating trace components from a circulating solution using a semipermeable membrane, and the use of a membrane purifier having a first and a second compartment, wherein said first and a second compartments are separated by a semipermeable membrane, for reducing the trace component and/or water content of a circulating solution stream in a method or system for removing carbon dioxide (CO2) using a circulating ammoniated solution.

19 Claims, 3 Drawing Sheets

(51) Int. Cl.
   *B01D 53/62*   (2006.01)
   *B01D 61/02*   (2006.01)
   *F23J 15/04*   (2006.01)

(52) U.S. Cl.
   CPC .......... *B01D 53/62* (2013.01); *B01D 61/025* (2013.01); *F23J 15/04* (2013.01); *B01D 2252/102* (2013.01); *B01D 2257/504* (2013.01); *B01D 2258/0283* (2013.01); *F23J 2215/50* (2013.01); *F23J 2219/40* (2013.01); *Y02C 10/04* (2013.01); *Y02C 10/06* (2013.01)

(56) References Cited

U.S. PATENT DOCUMENTS

| | | | |
|---|---|---|---|
| 6,596,253 | B1 | 7/2003 | Barrere-Tricca |
| 7,938,889 | B2 * | 5/2011 | Iijima .............................. 95/236 |
| 8,202,349 | B2 * | 6/2012 | Molaison ......................... 95/236 |
| 8,512,460 | B2 * | 8/2013 | Moniwa et al. ................. 96/240 |
| 2004/0154469 | A1 * | 8/2004 | Asprion et al. ................. 95/236 |
| 2005/0022665 | A1 * | 2/2005 | Baudot et al. ................... 96/240 |
| 2009/0199709 | A1 | 8/2009 | Rojey |
| 2010/0229720 | A1 * | 9/2010 | Sonwane et al. ................. 95/46 |
| 2011/0100218 | A1 * | 5/2011 | Wolfe .............................. 95/205 |
| 2012/0318142 | A1 * | 12/2012 | Weber et al. .................... 95/188 |
| 2013/0118350 | A1 * | 5/2013 | Rolker et al. .................... 96/234 |
| 2014/0060323 | A1 * | 3/2014 | Liu et al. ............................ 95/8 |
| 2014/0228598 | A1 * | 8/2014 | Datta et al. ................... 568/840 |

FOREIGN PATENT DOCUMENTS

| | | | |
|---|---|---|---|
| DE | 41 09 732 A1 * | 10/1992 | ............ B01D 53/00 |
| DE | 4109267 C1 | 10/1992 | |
| DE | 4109732 A1 | 10/1992 | |
| DE | 10117140 A1 | 10/2002 | |
| EP | 2229996 A1 | 9/2010 | |
| GB | 2449165 A | 11/2008 | |
| WO | 92/17401 A1 | 10/1992 | |
| WO | 2004/054688 A1 | 7/2004 | |
| WO | 2006022885 A1 | 3/2006 | |

OTHER PUBLICATIONS

European Search Report, From the European Searching Authority, European Patent Application No. 10178847 Completed Mar. 28, 2011, The Hague, Authorized Officer Thomas Bergt.
DE Patent Application No. 4109267, English language abstract, Published: Oct. 8, 1992, Applicant: Still Otto GMBH.
DE Patent Application No. 10117140, English language abstract, Published: Oct. 17, 2002, Applicant: Geesthacht GKSS.

* cited by examiner

TRACE COMPONENT REMOVAL IN CO2 REMOVAL PROCESSES BY MEANS OF A SEMIPERMEABLE MEMBRANE

This is a US National Phase application claiming priority to International Application No. PCT/IB2011/002136 having an International Filing Date of Sep. 14, 2011, incorporated herein in its entirety by reference.

FIELD OF THE INVENTION

The proposed invention relates to a system and method for removing carbon dioxide (CO2) from a gas stream by bringing the gas stream into contact with a circulating ammoniated solution stream such that carbon dioxide is absorbed in said ammoniated solution. More particularly, the proposed invention is directed to a chilled ammonia based process and system for removing CO2 from a gas stream.

BACKGROUND

In the combustion of a fuel, such as coal, oil, peat, waste, etc., in a combustion plant, such as those associated with boiler systems for providing steam to a power plant, a hot process gas (or flue gas) is generated. Such a flue gas will often contain, among other things, carbon dioxide (CO2). The negative environmental effects of releasing carbon dioxide to the atmosphere have been widely recognized, and have resulted in the development of processes adapted for removing carbon dioxide from the hot process gas generated in the combustion of the above mentioned fuels. One such system and process previously disclosed is the single-stage Chilled Ammonia based system and process for removal of CO2 from a post-combustion flue gas stream.

Known Chilled Ammonia based systems and processes (CAP) provide a relatively low cost means for capturing and removing CO2 from a gas stream, such as, for example, a post combustion flue gas stream. An example of such a system and process has previously been disclosed in the published international patent application WO 2006/022885 titled Ultra Cleaning of Combustion Gas Including the Removal of CO2. WO 2006/022885 discloses a method for removing carbon dioxide from a flue gas, which method includes capturing carbon dioxide from a flue gas cooled to a temperature below ambient temperature (preferably between 0° C. and 20° C., more preferably between 0° C. and 10° C.) in a CO2 absorber by means of an ammoniated solution or slurry. The CO2 is absorbed by the ammoniated solution in the absorber at a temperature between 0° C. and 20° C., more preferably between 0° C. and 10° C., after which the ammoniated solution is regenerated in a regenerator under elevated pressure and temperature to allow the CO2 to escape the ammoniated solution as gaseous carbon dioxide of high purity. In the process described in WO 2006/022885, the regenerated ammoniated solution may be reused in the CO2 absorption process such that a circulating stream of ammoniated solution is formed.

A problem in the chilled ammonia process as described in WO 2006/022885, is that water entering the circulating stream of ammoniated solution, for example as moisture in the incoming flue gas stream, is accumulated in the ammoniated solution. This accumulated water acts to dilute the ammoniated solution, thereby reducing the ability of the ammoniated solution to "capture" CO2 from a flue gas stream.

Furthermore, another problem in the chilled ammonia process as described in WO 2006/022885 is that trace components, i.e. components other than carbon dioxide, ammonia water and the respective ions/salts, captured in the Chilled Ammonia Process may accumulate.

Previously, the amount of water and trace components in the circulating ammoniated solution has been adjusted by, e.g., removing a portion of the ammoniated solution in a "bleed stream" and by compensating the dilution of the ammoniated solution by adding fresh ammonia. The ammoniated solution in the "bleed stream" must then be disposed of and fresh ammonia must be provided, which leads to increased costs and environmental issues.

Another solution is to include an evaporator, hereafter termed appendix stripper, which evaporates virtually all carbon dioxide, most ammonia and a significant amount of water. The evaporated compounds are reused in the process. The appendix stripper requires a fairly large heat input to evaporate the water, e.g., to double the amount of trace components roughly 50% of the water have to be evaporated, which makes the appendix stripper a major heat consumer. In addition, it requires cooling of the overhead stream. Depending on the operating pressure of the appendix stripper, this heat can be (partially) reused at a lower exergy level or has to be rejected by external cooling. High grade stainless steel or other resistant materials of construction are indicated for the appendix stripper due to the corrosive properties exhibited by the media and especially the trace components at increased concentrations, which is aggravated by the elevated temperature, at which the appendix stripper operates.

SUMMARY OF THE INVENTION

It is an object of the present invention to reduce or prevent accumulation of trace components in the ammoniated solution of chilled ammonia based systems and processes for removal of carbon dioxide (CO2) from gas streams.

It is another object of the present invention to reduce or prevent accumulation of trace components in the ammoniated solution of chilled ammonia based systems and processes with no or low added energy requirement on the system.

The construction and operation of industrial gas purification systems, e.g. for the removal of CO2 from the flue gas produced by the boiler unit of a power plant, are associated with high investment and operational costs. The aspects described herein are based on the inventive realization that in a chilled ammonia process for removal of CO2 from a flue gas, significant process improvements and operational cost reduction can be achieved by the use of a membrane separation step. It has been found that a membrane separation step may advantageously be used instead of, or as a complement to, the conventionally used appendix stripper for the separation of trace components from water and lighter boilers.

According to aspects illustrated herein, there is provided a system for removing carbon dioxide (CO2) from a gas stream by bringing the gas stream into contact with a circulating ammoniated solution stream such that CO2 is absorbed in said ammoniated solution, characterized in that the system comprises a membrane purifier, said membrane purifier having a first and a second compartment, wherein said first and second compartment are separated by a semipermeable membrane.

The ammoniated solution is typically aqueous and may be composed of, for example, water, ammonia, carbon dioxide and derivatives thereof. Furthermore, the ammoniated solution will in practice also contain varying amounts of trace components that are incorporated and accumulated in the ammoniated solution during the CO2 removal process. Trace components in the ammoniated solution may generally include all components not directly related to the CO2 removal process, i.e. all components except water, ammonia, carbon dioxide and derivatives thereof. Examples of derivatives of ammonia and carbon dioxide that may be present in the ammoniated solution include ammonium ions, bicarbonate ions, carbonate ions, and/or carbamate ions. Examples of trace components in the present disclosure include, but are not limited to, metal ions, chlorine, sulfates, and/or nitrates.

In an embodiment, the semipermeable membrane is selected so as to be permeable to water and/or ammonia and/or ammonium ion and impermeable to metal ions, chloride, sulfate, and/or nitrate. The first compartment of the membrane purifier may be configured to receive at least a fraction of a circulating solution from the system such that the solution is brought into contact with the semipermeable membrane. The second compartment of the membrane purifier may be configured to receive a permeate of the circulating solution from the first compartment through the semipermeable membrane. The second compartment of the membrane purifier may advantageously be configured to return the permeate of the circulating solution to the system, e.g. to the circulating solution from which it was received.

The use of a membrane purifier as described herein has many advantages compared to bleed streams or appendix strippers previously used to control the amounts of trace components and/or water. For example, the energy requirement of the membrane purifier is very low and mainly related to pumping the feed stream to the purifier. Intermittent gaseous product streams, such as those produced by an appendix stripper, are avoided. Since no heating is required, no heat integration is necessary to make the operation economical. Independent operation without utility systems (steam, cooling etc.) is possible. In addition, the membrane purifier allows switching between different feed solutions such as, stripper bottoms, water wash bottoms and lean solution. Significantly less equipment and utility tie-ins are required for the membrane purifier compared to an appendix stripper. A membrane purifier has potential for a footprint reduction and lower investment costs. For example, one membrane for industrial application, with 7.6 m$^2$ membrane area in a rolled module of about 1×0.1 m, would be able to purify about 300 l/hr. Due to the low operating temperatures (ambient temperature possible) the corrosion issues associated with higher temperatures, e.g. in strippers, are significantly reduced. In addition, undesired stripping of, e.g., sulfur compounds formed by sulfate decomposition is not possible.

In an embodiment, the system comprises a capture section configured to absorb CO2 from the gas stream using an ammoniated solution, and a regeneration section configured to remove CO2 from the ammoniated solution. The capture section may comprise a CO2 absorber configured to receive a gas stream containing CO2 and to bring the gas stream into contact with a stream of an ammoniated solution to form a stream of CO2 rich ammoniated solution, and the regeneration section may comprise a regenerator configured to receive a stream of CO2 rich ammoniated solution from the CO2 absorber, and to separate CO2 from the ammoniated solution to form a stream of CO2 lean ammoniated solution, and to return said stream of CO2 lean ammoniated solution to the CO2 absorber.

Some components that are added to or formed in the ammoniated solution are not removed by the regenerator or by evaporation in the CO2 absorber and may accumulate in the solution. Such components are referred to herein as "trace components". Examples of such trace components include, but are not limited to, metal ions, chlorine, sulfates, and/or nitrates. Accumulation of trace components may cause various problems including, but not limited to, increased corrosion, scaling and deposits, as well as deactivation of the ammoniated solution.

In various embodiments, the chilled ammonia system and process may also comprise a "water wash" step, effective to remove ammonia and other trace components present in the gas stream leaving the CO2 absorber. The water wash step generally comprises contacting the gas stream leaving the CO2 absorber with a wash solution, generally water or a dilute aqueous solution, in a suitable absorber vessel. Such water wash sections are well known in the prior art.

In an embodiment the system comprises an ammonia absorber configured to absorb ammonia from the gas stream using a wash solution, and an ammonia stripper configured to remove ammonia from the wash solution. The ammonia absorber may be configured to receive a gas stream depleted in CO2 from the CO2 absorber and bring the gas stream into contact with a stream of wash solution such that ammonia is absorbed in said stream of wash solution, and the ammonia stripper may be configured to receive wash solution containing absorbed ammonia from the ammonia absorber and remove ammonia from the wash solution. When ammonia has been removed in the ammonia stripper, the wash solution may be sent back for reuse in the ammonia absorber.

Some components that are added to or formed in the wash solution are not removed by the ammonia stripper or by evaporation in the ammonia absorber and may accumulate in the solution. Such components are referred to herein as "trace components". Examples of such trace components include, but are not limited to, metal ions, chlorine, sulfates, and/or nitrates. Accumulation of trace components may cause various problems including, but not limited to, increased corrosion, scaling and deposits.

The membrane purifier may advantageously be implemented in a CO2 removal system further comprising a water wash step for removal of residual ammonia from the gas stream which has been treated in the CO2 absorber.

The circulating solution which is purified in the membrane purifier may be selected from the circulating ammoniated solution of the capture or regeneration section and the circulating wash solution of the water wash section. In an embodiment, the circulating solution is the circulating ammoniated solution of the capture or regeneration section. In another embodiment, the circulating solution is the circulating wash solution.

According to other aspects illustrated herein, there is provided a method for removing carbon dioxide (CO2) from a gas stream by bringing the gas stream into contact with a circulating ammoniated solution stream such that CO2 is absorbed in said ammoniated solution, said method comprising the step of separating trace components from a circulating solution using a semipermeable membrane.

Advantages of the method according to the aspects illustrated herein correspond to the advantages set out for the system described above.

In an embodiment, the method for removing carbon dioxide comprises a) bringing a stream of an ammoniated solution into contact with a gas stream containing CO2, to form a CO2 rich stream of ammoniated solution, b) removing at least a portion of the CO2 from the CO2 rich stream of ammoniated solution of step a), to form a CO2 lean stream of ammoniated solution, c) recirculating at least a portion of the CO2 lean ammoniated solution formed in step b) to step a), and being characterized by the step of d) separating trace components from the circulating ammoniated solution using a semipermeable membrane.

In an embodiment further comprising a water wash step, the method may further comprise a1) bringing a stream of a wash solution into contact with a gas stream containing ammonia, to form an ammonia rich stream of wash solution, b1) removing at least a portion of the ammonia from the ammonia rich stream of wash solution of step a1), to form an ammonia lean stream of wash solution, and c1) recirculating at least a portion of the ammonia lean wash solution formed in step b1) to step a1), and being characterized by the step of d1) separating trace components from the circulating wash solution using a semipermeable membrane.

According to other aspects illustrated herein, there is provided the use of a membrane purifier having a first and a second compartment, wherein said first and a second compartments are separated by a semipermeable membrane, for reducing the trace component and/or water content of a circulating solution stream in a method or system for removing carbon dioxide (CO2) using a circulating ammoniated solution.

Advantages of the use of a membrane membrane purifier for reducing the water and/or trace component content in system or process according to the aspects illustrated herein correspond to the advantages set out for the system and method described above.

In an embodiment of any one of the above aspects, said method or system for removing CO2 from a gas stream by bringing the gas stream into contact with a circulating ammoniated solution such that CO2 is absorbed in said ammoniated solution may be a chilled ammonia based method or system for removing CO2 from a gas stream. WO 2006/022885 discloses one such chilled ammonia method and system for removing carbon dioxide from a flue gas, which method includes capturing carbon dioxide from a flue gas cooled to a temperature below ambient temperature (preferably between 0° C. and 20° C., more preferably between 0° C. and 10° C.) in a CO2 absorber by means of an ammoniated solution or slurry. The CO2 is absorbed by the ammoniated solution in the absorber at a temperature between 0° C. and 20° C., more preferably between 0° C. and 10° C., after which the ammoniated solution is regenerated in a regenerator under elevated pressure and temperature to allow the CO2 to escape the ammoniated solution as gaseous carbon dioxide of high purity.

Further objects, features and advantages of the present invention will be apparent from the description and the claims. The above described and other features are exemplified by the following figures and detailed description.

BRIEF DESCRIPTION OF THE DRAWINGS

Many aspects of the invention can be better understood with reference to the following drawings. The figures are exemplary embodiments, wherein the like elements are numbered alike.

DETAILED DESCRIPTION OF THE INVENTION

Herein, the invention will be described in detail with reference to the drawings.

The CO2 removal system may generally form a part of a gas cleaning system for cleaning flue gas emitted by, e.g., the combustion chamber of a boiler system used in a steam generator system of a power generation plant. The gas cleaning system may comprise a dust removal system and a scrubber system configured for removal of particles and other contaminants from the flue gas. The CO2 removal system is configured to remove CO2 from the flue gas stream FG before emitting the cleaned flue gas stream to an exhaust stack (or alternatively additional processing). The CO2 removal system is also configured to output CO2 removed from the flue gas stream FG.

Figure 1:
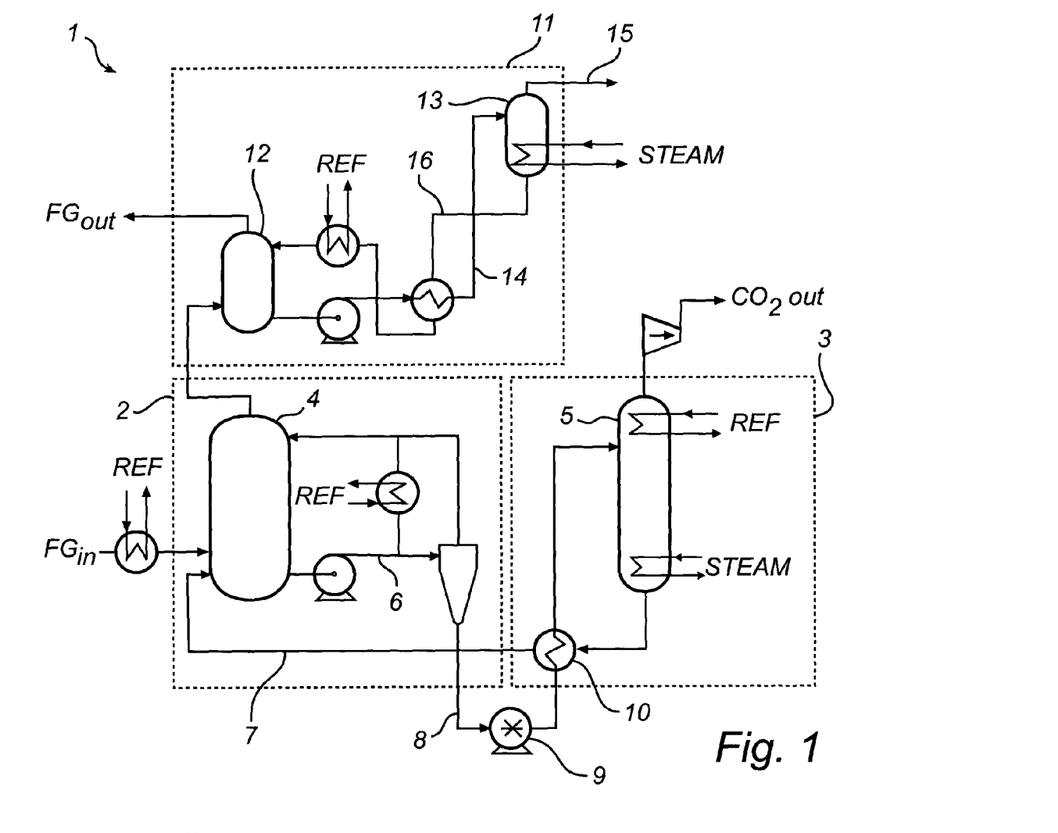
FIG. 1 is a diagram generally depicting an example of a gas cleaning system.

With reference to FIG. 1 the CO2 removal system 1 includes a capture section 2 for capturing and removing CO2 from a flue gas stream FG and a regeneration section 3 for regenerating ammoniated solution used to remove CO2 from the flue gas stream.

In this embodiment, the CO2 capture section 2 is a chilled ammonia based CO2 capture section. In a chilled ammonia based system/method for CO2 removal, a CO2 absorber 4 is provided in which an absorbent ammoniated solution (ammoniated solution) is contacted with a flue gas stream (FG) containing CO2. An example of a known chilled ammonia based CO2 removal method and system is described in WO 2006/022885. WO 2006/022885 discloses a method for removing carbon dioxide from a flue gas, which method includes capturing carbon dioxide from a flue gas cooled to a temperature below ambient temperature (preferably between 0° C. and 20° C., more preferably between 0° C. and 10° C.) in a CO2 absorber by means of an ammoniated solution or slurry. The CO2 is absorbed by the ammoniated solution in the absorber at a temperature between 0° C. and 20° C., more preferably between 0° C. and 10° C., after which the ammoniated solution is regenerated in a regenerator under elevated pressure and temperature to allow the CO2 to escape the ammoniated solution as gaseous carbon dioxide of high purity.

The ammoniated solution is typically aqueous and may be composed of, for example, water, ammonia, carbon dioxide and derivatives thereof. Examples of derivatives of ammonia and carbon dioxide that may be present in the ammoniated solution include ammonium ions, bicarbonate ions, carbonate ions, and/or carbamate ions. The ammoniated solution may also include a promoter to enhance the chemical reaction kinetics involved in the capture of CO2 by the ammoniated solution. For example, the promoter may include an amine (e.g. piperazine) or an enzyme (e.g., carbonic anhydrase or its analogs), which may be in the form of a solution or immobilized on a solid or semi-solid surface.

The CO2 absorber 4 is configured to receive a flue gas stream (FG) originating from, for example, the combustion chamber of a fossil fuel fired boiler (not shown). It is also configured to receive a lean ammoniated solution supply from regenerator 5. The lean ammoniated solution is introduced into the CO2 absorber 4 via a liquid distribution system while the flue gas stream FG is also received by the CO2 absorber via a flue gas inlet.

The ammoniated solution is put into contact with the flue gas stream via a gas-liquid contacting device (hereinafter, mass transfer device, MTD) used for mass transfer and located in the CO2 absorber 4 and within the path that the flue gas stream travels from its entrance via the inlet to the CO2 absorber exit. The MTD may be, for example, one or more commonly known structured or random packing materials, or a combination thereof.

Once contacted with the flue gas stream in the CO2 absorber 4, the ammoniated solution acts to absorb CO2 from the flue gas stream, thus making the ammoniated solution "rich" with CO2 (rich solution). The rich ammoniated solution continues to flow downward through the MTD and is then collected in the bottom of the CO2 absorber. Rich solution collected in the CO2 absorber may be cooled and directly recycled via a liquid conduit 6 and a liquid distribution system to the top of the CO2 absorber 4 for use in capturing further CO2 from a gas stream, resulting in a rich ammoniated solution having a higher concentration of absorbed CO2. At least a portion of the rich solution collected in the CO2 absorber is sent to the regeneration section 3 for regeneration.

In order to convert the rich ammoniated solution to "lean" ammoniated solution which is suitable for reuse in the CO2 absorber, at least a portion of the rich ammoniated solution is regenerated in the regeneration section 3 comprising a regenerator 5. In the regenerator, the ammoniated solution is treated to release the CO2 absorbed from the flue gas stream. The CO2 released from the ammoniated solution may then be output to storage or other predetermined uses/purposes. Once the CO2 is released from the ammoniated solution, the ammoniated solution is said to be "lean". The lean ammoniated solution is then again ready to absorb CO2 from a flue gas stream and may be directed back to the CO2 absorber 4 via liquid conduit 7.

The regenerator 5 is configured to receive a rich solution feed from the capture section via liquid conduit 8 and to return a lean solution feed to the capture section once CO2 has been separated from the rich solution. The separated CO2 leaves the regenerator via a gas exit. The regenerator may further comprise a mass transfer device (MTD) which facilitates heat and mass transfer between the rich solution which is fed to the regenerator and the vapor produced in the regenerator, e.g. by means of a re-boiler.

During the regeneration process, the rich ammoniated solution is pressurized and heated so that CO2 contained in the solution separates from the ammoniated solution. The regeneration process generally comprises raising the pressure in the regenerator to in the range of 2-150 bar, preferably 10-30 bar, e.g. using a high pressure pump 9, and raising the temperature of the ammoniated solution to in the range of 50-200° C., preferably 100-150° C. Under these conditions, nearly all of the absorbed CO2 is released from the ammoniated solution into the gas phase. The gas phase may also comprise a minor portion of ammonia (ammonia slip) which may be condensed and returned to the capture section for use in capturing further CO2. Lean ammoniated solution is collected in the bottom of the regenerator 5.

A heat exchanger 10 may be configured to heat the rich ammoniated solution coming from the CO2 absorber 4 using hot lean ammoniated solution coming from the regenerator 5.

As described above, the ammoniated solution is circulated between the capture section 2 and the regeneration section 3 so as to form a cycle. The composition of the circulating solution may vary over the course of a cycle. The concentration of CO2 and derivatives thereof is increased in the CO2 absorber as the ammoniated solution absorbs CO2 from the gas stream, and it is reduced again in the regenerator as CO2 is separated from the ammoniated solution. The concentration of ammonia may decrease as some ammonia is evaporated and carried off from the CO2 absorber by the gas stream. Some components that are added to or formed in the ammoniated solution are not removed by the regenerator or by evaporation in the CO2 absorber and may accumulate in the solution. Such components are referred to herein as "trace components". Examples of such trace components include, but are not limited to, metal ions, chlorine, sulfates, and/or nitrates. Accumulation of trace components may cause various problems including, but not limited to, increased corrosion, scaling and deposits, as well as deactivation of the ammoniated solution.

Furthermore, water vapor entering the system with the gas stream may also accumulate in the ammoniated solution. In order to maintain the effectiveness of the ammoniated solution, it is necessary to remove water from the ammoniated solution that otherwise would accumulate in the system and decrease the absorption capacity of the ammoniated solution.

Previously, the amount of water and trace components in the circulating ammoniated solution has generally been adjusted by, removing a portion of the ammoniated solution in a "bleed stream" and by compensating the dilution of the ammoniated solution by adding fresh ammonia. The ammoniated solution in the "bleed stream" must then be disposed of and fresh ammonia must be provided, which leads to increased costs.

Previous attempts to adjust the amount of water in the circulating ammoniated solution have also included the introduction of a stripper operative to separate water from ammonia and remove the water from the system. Although feasible, the stripper may increase the overall energy requirement and the investment cost of the system.

After the CO2 absorption, traces of ammonia from the ammoniated solution remain in the gas stream. These contaminants have to be removed from the gas stream in a separate process step. The CO2 removal system 1 may therefore, optionally, further comprise a water wash section operative for removing ammonia present in the gas stream leaving the CO2 absorber 4. An example of a water wash section is schematically illustrated in FIG. 1. The water wash section 11 generally comprises an absorber 12 (referred to herein as the ammonia absorber) and a stripper 13 (referred to herein as the ammonia stripper). During the water wash process, a stream of wash solution is circulated between the ammonia absorber 12 and the ammonia stripper 13.

The wash solution of the water wash step may consist of water or an aqueous solution. The wash solution should be suitable for absorption of ammonia from a gas stream and should preferably contain no, or low concentrations of, ammonia or ammonium. The wash solution may preferably have a neutral to slightly acidic pH value. Furthermore, the wash solution will in practice also contain varying amounts of trace components that are incorporated and accumulated in the wash solution during the ammonia removal process. Trace components in the wash solution may generally include all components not directly related to the ammonia removal process, i.e. all components except water, ammonia, carbon dioxide and derivatives thereof. Examples of derivatives of ammonia and carbon dioxide that may be present in the ammoniated solution include ammonium ions, bicarbonate ions, carbonate ions, and/or carbamate ions. Examples of trace components in the present disclosure include, but are not limited to, metal ions, chlorine, sulfates, and/or nitrates.

The concentrations of ammonia and ammonium are generally significantly lower in the wash solution than in the ammoniated solution.

In the ammonia absorber 12 a gas stream depleted in CO2 from the CO2 absorber is brought into contact with the stream of wash solution such that ammonia is absorbed in said stream of wash solution. At least a portion of the wash solution used in the ammonia absorber is withdrawn and fed to the ammonia stripper 13 via liquid conduit 14. In the ammonia stripper 13, a gaseous phase comprising ammonia is separated from the wash solution and removed from the water wash section via a gas conduit 15. In addition to ammonia, the gaseous phase from the ammonia stripper 13 may also contain water vapor, CO2 and other low-boiling contaminants. The separated gaseous phase comprising ammonia may be returned to the ammoniated solution of the CO2 removal system, e.g. to the regenerator 5, to minimize the loss of ammonia from the system. The wash solution from which ammonia has been separated is recycled to the ammonia absorber 12 via liquid conduit 16 for use in capturing further ammonia from a gas stream.

The wash solution is circulated between the ammonia absorber 12 and the ammonia stripper 13 so as to form a cycle. The composition of the circulating wash solution may vary over the course of a cycle. The concentration of ammonia and derivatives thereof is increased in the ammonia absorber 12 as the wash solution absorbs ammonia from the gas stream, and it is reduced again in the ammonia stripper 13 as ammonia is separated from the wash solution. Some components that are added to or formed in the wash solution are not removed by the ammonia stripper and may accumulate in the solution. Such components are referred to herein as "trace components". Examples of such trace components include, but are not limited to, metal ions, chlorine, sulfates, and/or nitrates. Accumulation of trace components may cause various problems including, but not limited to, increased corrosion, scaling and deposits.

As described above, there is a problem with accumulation of trace components and/or water in circulating solution streams in CO2 removal systems.

According to the present disclosure, the CO2 removal system further comprises a membrane purifier, operative for removing trace components and/or water from circulating solutions in the system.

Figure 2:
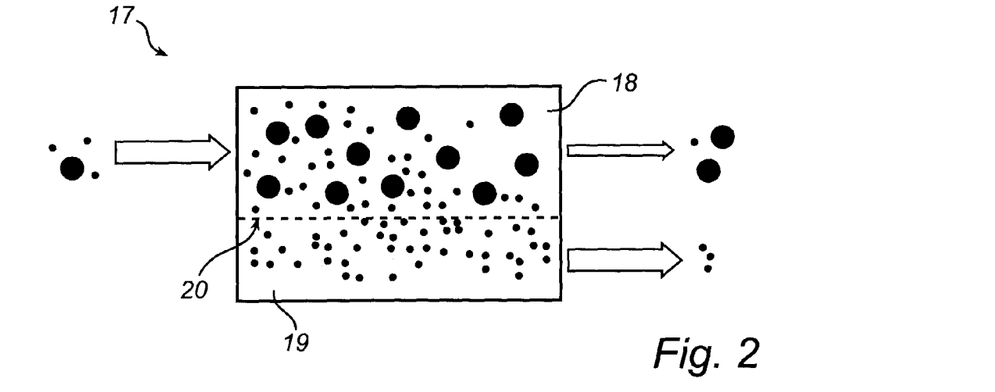
FIG. 2 is a diagram generally depicting a membrane purifier.

A membrane purifier is schematically depicted in FIG. 2. The membrane purifier 17 may generally comprise a first compartment 18 and a second compartment 19, wherein said first and a second compartments are separated by a semipermeable membrane 20. Such membrane purifiers are widely employed, e.g., in the field of water purification and water desalination. The membrane purifier may for example be configured for cross-flow or dead end operation, although cross-flow configuration is generally preferred since it allows continuous operation of the purifier. A large range of membrane purifiers for various purposes are commercially available. A person skilled in the art may select a suitable membrane purifier for a specific application based on, e.g., desired selectivity, flow rates and pH and temperature conditions.

The membrane purifier may be arranged in liquid connection with the circulating solution of the CO2 removal system such that solution containing the trace components is forwarded to and received by the first compartment 18, and such that purified solution, containing a reduced amount of trace components, is returned to the circulating solution of the CO2 removal system. Solution may be supplied to the membrane purifier passively, e.g. by means of the internal pressure of the CO2 removal system, or actively, e.g. by means of a pump. The amount of circulating solution which is received by the membrane purifier may vary within a wide range depending on the capacity of the membrane purifier and the need for trace component and/or water removal in a specific CO2 removal system.

A semipermeable membrane, also termed a selectively-permeable membrane, a partially-permeable membrane or a differentially-permeable membrane, is a membrane that will allow certain molecules or ions to pass through it by diffusion. The rate of passage depends on the pressure, concentration, and temperature of the molecules or solutes on either side, as well as the permeability of the membrane to each solute. Depending on the membrane and the solute, permeability may depend on solute size, solubility, properties, or chemistry. How the membrane is constructed to be selective in its permeability will determine the rate and the permeability.

The semipermeable membrane may be synthetic and may comprise organic or inorganic materials including solids such as metal or ceramic, homogenous films (polymers), heterogeneous solids (polymeric mixes, mixed glasses), and liquids. The most commercially utilized synthetic membranes in separation industry are made of polymeric structures. The most common polymers in membrane synthesis are cellulose acetates, nitrates, and esters, polysulfone, polyether sulfone, polyacrylonitrile, polyamide, polyimide, polyethylene and polypropylene, polytetrafluoroethylene, polyvinylidene fluoride, polyvinylchloride.

Membranes used in reverse osmosis are often made out of polyimide or polyamide, chosen primarily for their permeability to water and relative impermeability to various dissolved impurities including salt ions and other small molecules that cannot be filtered. Polyamide and polyimide based membranes have been found to be useful in a membrane purifier for use according to the various aspects described herein. The semipermeable membrane may be provided in the form of a thin film composite membrane. A thin film composite membrane is generally a film from two or more layered materials.

In an embodiment, the semipermeable membrane comprises a polyamide or polyimide. In an embodiment, the semipermeable membrane is a thin film composite membrane. In a more specific embodiment, the semipermeable membrane is a polyamide or polyimide based thin film composite membrane. As specific examples of semipermeable membranes suitable for use in the aspects described herein can be mentioned the range of membranes provided by the Dow Chemical Company under the tradename FILMTEC™.

Semipermeable membranes have been found to be especially suitable for use with aqueous solutions comprising ammonia or ammonium, since membranes that are permeable to water often also exhibit permeability to ammonia and/or ammonium. Consequently, the membrane purifier of the system described herein allows accumulated trace components to be removed from the system while minimizing the loss of ammonia from the system.

The membrane purifier generally comprises a first and a second compartment, wherein said first and a second compartments are separated by the semipermeable membrane. The first compartment may be configured to receive solution from the system and to bring the solution into contact with the semipermeable membrane. The second compartment of the membrane purifier is configured to receive a permeate of the solution through the semipermeable membrane from the first compartment. The resulting solution in the first compartment is referred to as the retentate and the resulting solution in the second compartment is referred to as the permeate.

The permeate may advantageously be reused in the chilled ammonia process. Thus, in an embodiment, the second compartment of the membrane purifier is further configured to return the permeate to the circulating solution stream from which it was received.

The retentate, in which the impurities have been concentrated, is generally removed from the system and discarded. However, depending on the actual composition of the retentate, further treatment can be considered. For instance, neutralization, for example with ammonia, by caustic injection or by reuse in the process, may be required depending on e.g. the sulfate and chlorine ion concentrations. Alternatively, the retentate may be reused in a portion of the system which is less sensitive to impurities.

In some embodiments, the membrane purifier may further comprise a recirculation loop configured to return a portion of the retentate leaving the first compartment and combine it with the solution entering the first compartment for additional treatment in the membrane purifier. Such a recirculation loop may comprise a liquid conduit connecting the exit of the first compartment with the inlet of the first compartment, and a flow regulation device for controlling the amount of retentate to be recirculated. In an embodiment schematically depicted in FIG. 3a, the membrane purifier 17 is implemented in the CO2 capture section 2 of the system. In this embodiment, the membrane purifier is configured to receive at least a portion of the ammoniated solution circulating between the CO2 absorber 4 and the regenerator 5. The ammoniated solution may be "lean" ammoniated solution, received from liquid conduit 7 via liquid conduit 7a. The membrane purifier 17 is configured to receive the solution into the first compartment 18, such that the solution comes in contact with the semipermeable membrane 20. The semipermeable membrane may be a polyamide or polyimide based thin film composite membrane, for example a FILMTEC™ membrane. Water ammonia and ammonium ions diffuse, at least partially, through the membrane while larger ions, such as metal ions, chlorine, sulfates, and/or nitrates do not pass through the membrane. The permeate, mainly water, ammonia and ammonium ion, is collected in the second compartment 19 and returned to the circulating ammoniated solution, e.g. at the bottom of the regenerator 5 or in liquid conduit 7 via liquid conduit 7b. The retentate, comprising the concentrated trace components, is discarded or reused in the process.

Figure 3A:
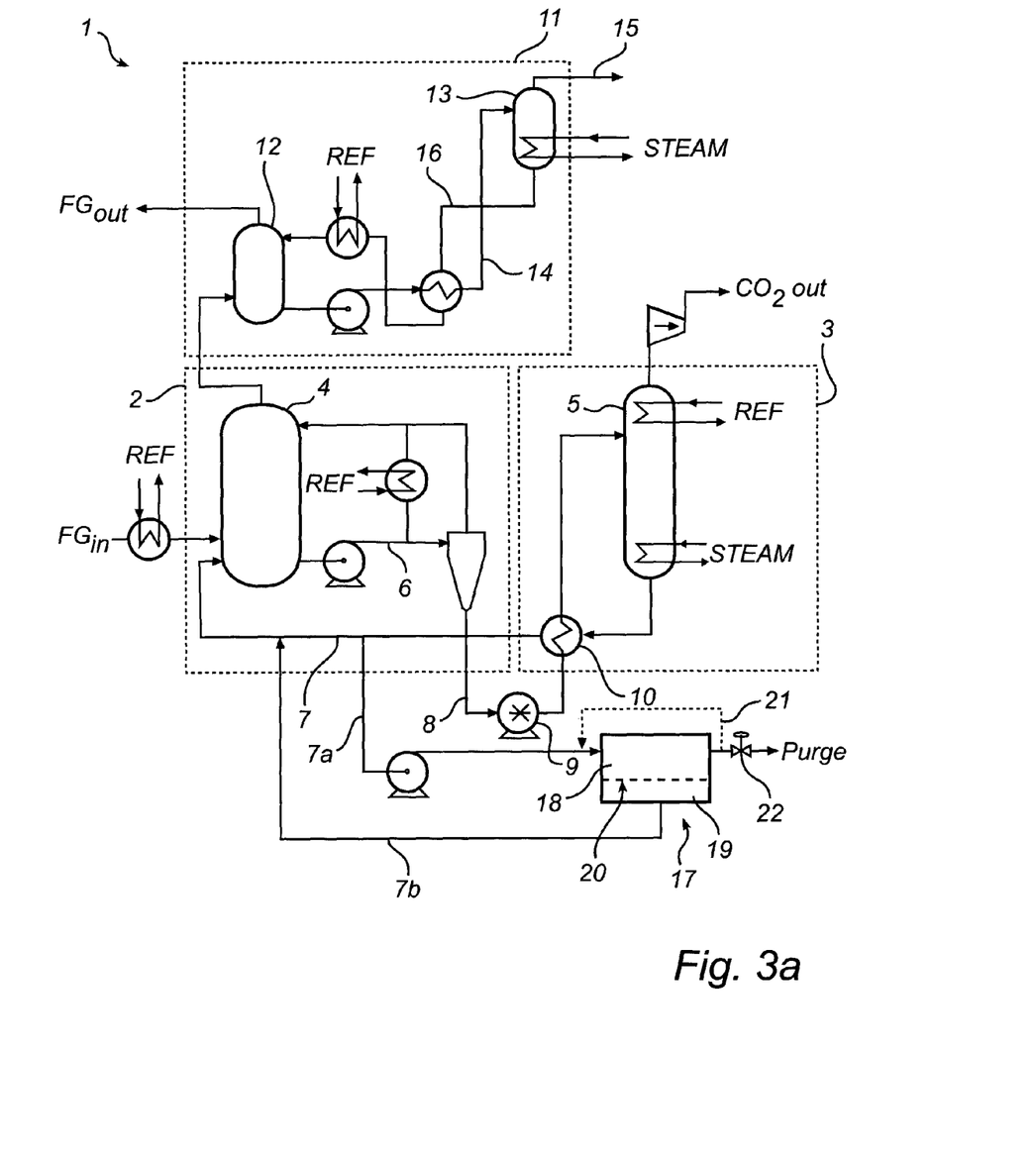
FIGS. 3a and 3b generally depict embodiments of a gas cleaning system comprising a membrane purifier.

Optionally the membrane purifier may further comprise a recirculation loop configured to return a portion of the retentate leaving the first compartment 18 and combine it with the solution entering the first compartment 18 for additional treatment in the membrane purifier. Such a recirculation loop may comprise a liquid conduit 21 connecting the exit of the first compartment with the inlet of the first compartment, and a flow regulation device 22 for controlling the amount of retentate to be recirculated.

Figure 3B:
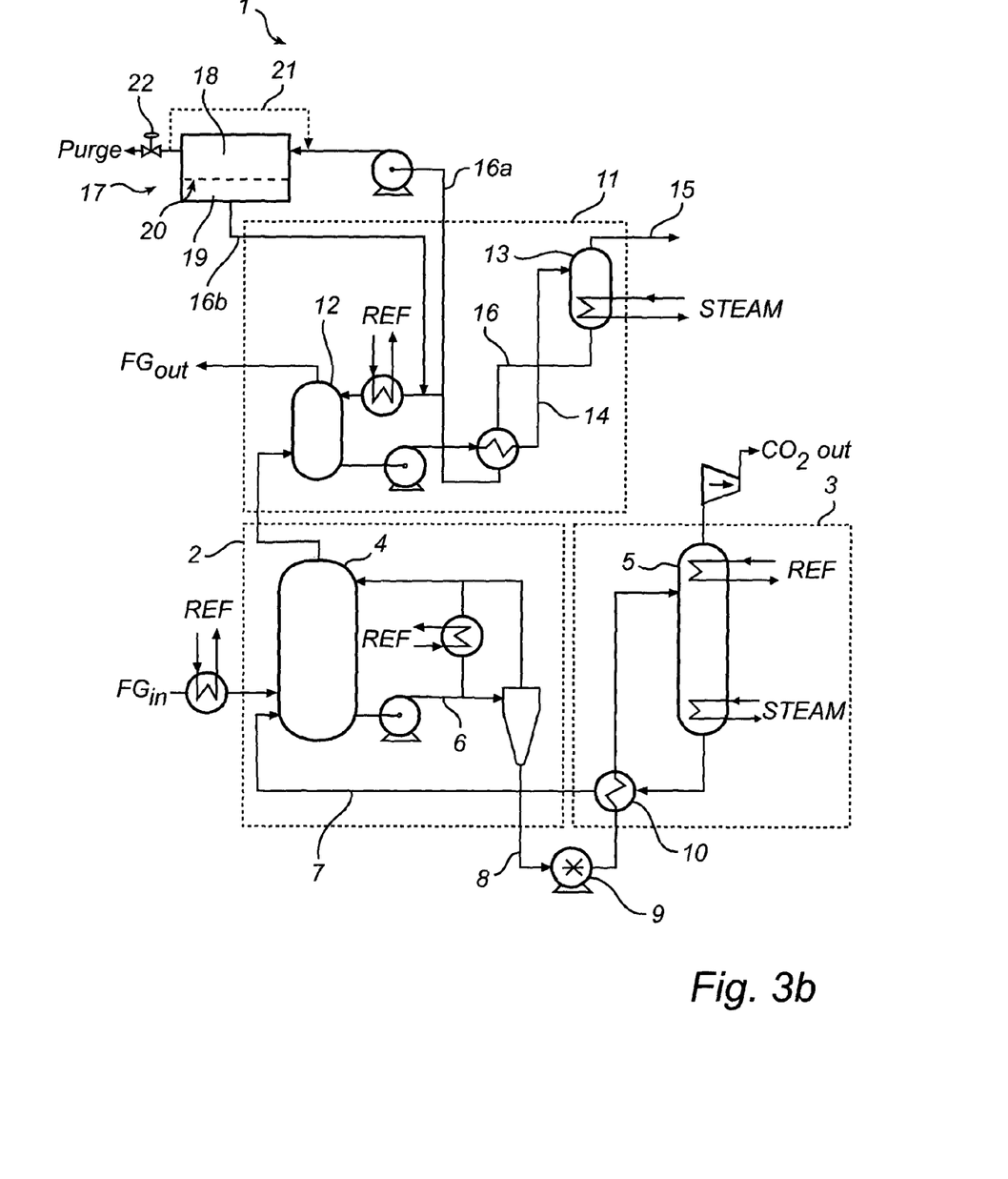

In an embodiment schematically depicted in FIG. 3b, the membrane purifier 17 is implemented in the water wash section 11 of the system. In this embodiment, the membrane purifier is configured to receive at least a portion of the wash solution circulating between the ammonia absorber 12 and the ammonia stripper 13. The wash solution may be wash solution received from the bottom of the ammonia stripper or from the liquid conduit 16 via liquid conduit 16a. The membrane purifier 17 is configured to receive the wash solution into the first compartment 18, such that the solution comes in contact with the semipermeable membrane 20. The semipermeable membrane may be a polyamide or polyimide based thin film composite membrane, for example a FILMTEC™ membrane. Water ammonia and ammonium ions diffuse, at least partially, through the membrane while larger ions, such as metal ions, chlorine, sulfates, and/or nitrates do not pass through the membrane. The permeate, mainly water, is collected in the second compartment and returned to the circulating wash solution, e.g. at the bottom of the ammonia stripper or in the wash solution conduit via liquid conduit 16b. The retentate, comprising the concentrated trace components, is discarded.

Optionally the membrane purifier may further comprise a recirculation loop configured to return a portion of the retentate leaving the first compartment 18 and combine it with the solution entering the first compartment 18 for additional treatment in the membrane purifier. Such a recirculation loop may comprise a liquid conduit 21 connecting the exit of the first compartment with the inlet of the first compartment, and a flow regulation device 22 for controlling the amount of retentate to be recirculated.

Advantages of the Invention

The energy requirement of the membrane purifier is very low and mainly related to pumping the feed stream. Intermittent gaseous product streams are avoided. Since no heating is required, no heat integration is necessary to make the operation economical. Independent operation without utility systems (steam, cooling etc.) is possible. In addition, the membrane purifier allows switching between different feed solutions such as, stripper bottoms, water wash bottoms and lean solution.

Significantly less equipment and utility tie-ins are required for the membrane purifier compared to an appendix stripper. A membrane purifier has potential for a footprint reduction and lower investment costs. For example, one membrane for industrial application, with 7.6 $m^2$ membrane area in a rolled module of about 1×0.1 m, would be able to purify about 300 l/hr.

Due to the low operating temperatures (ambient temperature possible) the corrosion issues associated with higher temperatures, e.g. in strippers, are significantly reduced. In addition, undesired stripping of, e.g., sulfur compounds formed by sulfate decomposition is not possible.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A chilled ammonia based system for removing carbon dioxide (CO2) from a flue gas stream,
the chilled ammonia based system comprising:
a capture section configured to absorb CO2 from the flue gas stream using an ammoniated solution;
a regeneration section configured to remove CO2 from the ammoniated solution; and
a membrane purifier configured to separate accumulated trace components from the ammoniated solution, said membrane purifier having a first compartment and a second compartment, wherein said first and second compartment are separated by a semipermeable membrane; and wherein the ammoniated solution is circulated between the capture section and the regeneration section.

2. The chilled ammonia based system according to claim 1, wherein the capture section comprises a CO2 absorber configured to receive and bring into contact the flue gas stream containing CO2 with the ammoniated solution to form a stream of CO2 rich ammoniated solution and a gas stream depleted in CO2; and wherein the regeneration section comprises a regenerator configured to receive the stream of CO2 rich ammoniated solution from the CO2 absorber, and to separate CO2 from the stream of CO2 rich ammoniated solution to form a stream of CO2 lean ammoniated solution, and to return said stream of CO2 lean ammoniated solution to the CO2 absorber.

3. The chilled ammonia based system according to claim 2, further comprising:

a water wash section for removing ammonia from the gas stream depleted in CO2 by bringing the gas stream depleted in CO2 into contact with a circulating wash solution stream such that ammonia is absorbed in said circulating wash solution stream;

an ammonia absorber configured to absorb ammonia from the gas stream depleted in CO2 using said circulating wash solution stream; and an ammonia stripper configured to remove ammonia from said wash solution stream.

4. The chilled ammonia based system according to claim 3, wherein said ammonia absorber is configured to receive the gas stream depleted in CO2 from the CO2 absorber and bring the gas stream depleted in CO2 into contact with said circulating wash solution stream such that ammonia is absorbed in said circulating wash solution stream; and wherein said ammonia stripper is configured to receive said wash solution stream containing absorbed ammonia from the ammonia absorber and remove ammonia from said wash solution stream.

5. The chilled ammonia based system according to claim 1, wherein the first compartment of the membrane purifier is configured to receive at least a fraction of a circulating solution from the chilled ammonia based system such that the circulating solution is brought into contact with the semipermeable membrane.

6. The chilled ammonia based system according to claim 5, wherein said circulating solution is selected from the circulating ammoniated solution of the capture or regeneration section and a circulating wash solution of a water wash section.

7. The chilled ammonia based system according to claim 6, wherein said circulating solution is the circulating ammoniated solution of the capture or regeneration section.

8. The chilled ammonia based system according to claim 6, wherein said circulating solution is the circulating wash solution of the water wash section.

9. The chilled ammonia based system according to claim 5, wherein the second compartment of the membrane purifier is configured to receive a permeate of the circulating solution from the first compartment through the semipermeable membrane.

10. The chilled ammonia based system according to claim 9, wherein the second compartment of the membrane purifier is configured to return the permeate of the circulating solution to the chilled ammonia based system.

11. The chilled ammonia based system according to claim 10, wherein the second compartment of the membrane purifier is configured to return the permeate of the-circulating solution to the-circulating solution from which it was received.

12. The chilled ammonia based system according to claim 1, wherein the semipermeable membrane is permeable to water and/or ammonia and/or ammonium ion and impermeable to metal ions, chloride, sulfate, and/or nitrate.

13. The chilled ammonia based system according to claim 1, wherein the semipermeable membrane comprises a polyamide or polyimide.

14. A chilled ammonia based method for removing carbon dioxide (CO2) from a flue gas stream, the chilled ammonia based method comprising:

a) bringing a stream of an ammoniated solution into contact with the flue gas stream containing CO2, to form a CO2 rich stream of ammoniated solution, b) removing at least a portion of the CO2 from the CO2 rich stream of ammoniated solution of step a), to form a CO2 lean stream of ammoniated solution, c) recirculating at least a portion of the CO2 lean stream of ammoniated solution formed in step b) to step a), and d) separating accumulated trace components from the ammoniated solution using a semipermeable membrane.

15. The chilled ammonia based method according to claim 14, further comprising:

a1) bringing a stream of a wash solution into contact with a gas stream containing ammonia, to form an ammonia rich stream of wash solution, b1) removing at least a portion of the ammonia from the ammonia rich stream of wash solution of step a1), to form an ammonia lean stream of wash solution, c1) recirculating at least a portion of the ammonia lean stream of wash solution formed in step b1) to step a1), and d1) separating accumulated trace components from the stream of the wash solution using a semipermeable membrane.

16. The chilled ammonia based system according to claim 1, wherein the accumulated trace components are components not removed by the regeneration section and being accumulated in the ammoniated solution while removing CO2 from the flue gas stream.

17. The chilled ammonia based system according to claim 16, wherein the accumulated trace components include one or more of metal ions, chlorine, sulfates, and/or nitrates.

18. The chilled ammonia based method according to claim 14, wherein the accumulated trace components are components not removed by the regeneration section and being accumulated in the ammoniated solution while removing CO2 from the flue gas stream.

19. The chilled ammonia based system according to claim 18, wherein the accumulated trace components include one or more of metal ions, chlorine, sulfates, and/or nitrates.

* * * * *

UNITED STATES PATENT AND TRADEMARK OFFICE
CERTIFICATE OF CORRECTION

| | | |
|---|---|---|
| PATENT NO. | : 9,463,410 B2 | Page 1 of 1 |
| APPLICATION NO. | : 13/825961 | |
| DATED | : October 11, 2016 | |
| INVENTOR(S) | : Bockman et al. | |

It is certified that error appears in the above-identified patent and that said Letters Patent is hereby corrected as shown below:

On the Title Page

Item (75), under "Inventors", in Column 1, Line 1, delete "Jon K" and insert -- Jon K. --, therefor.

Item (57), under "ABSTRACT", in Column 2, Line 16, delete "a second compartments" and insert -- second compartments --, therefor.

In the Specification

In Column 5, Lines 25-26, delete "a second compartments" and insert -- second compartments --, therefor.

In Column 5, Line 31, delete "membrane membrane" and insert -- membrane --, therefor.

In Column 9, Line 48, delete "a second compartments" and insert -- second compartments --, therefor.

In Column 10, Lines 60-61, delete "a second compartments" and insert -- second compartments --, therefor.

In the Claims

In Column 14, Line 60, in Claim 19, delete "system" and insert -- method --, therefor.

Signed and Sealed this
Twelfth Day of June, 2018

Andrei Iancu
*Director of the United States Patent and Trademark Office*